T. BOGAN.
Churn.
No. 68,034.                                                                 Patented Aug. 27, 1867.
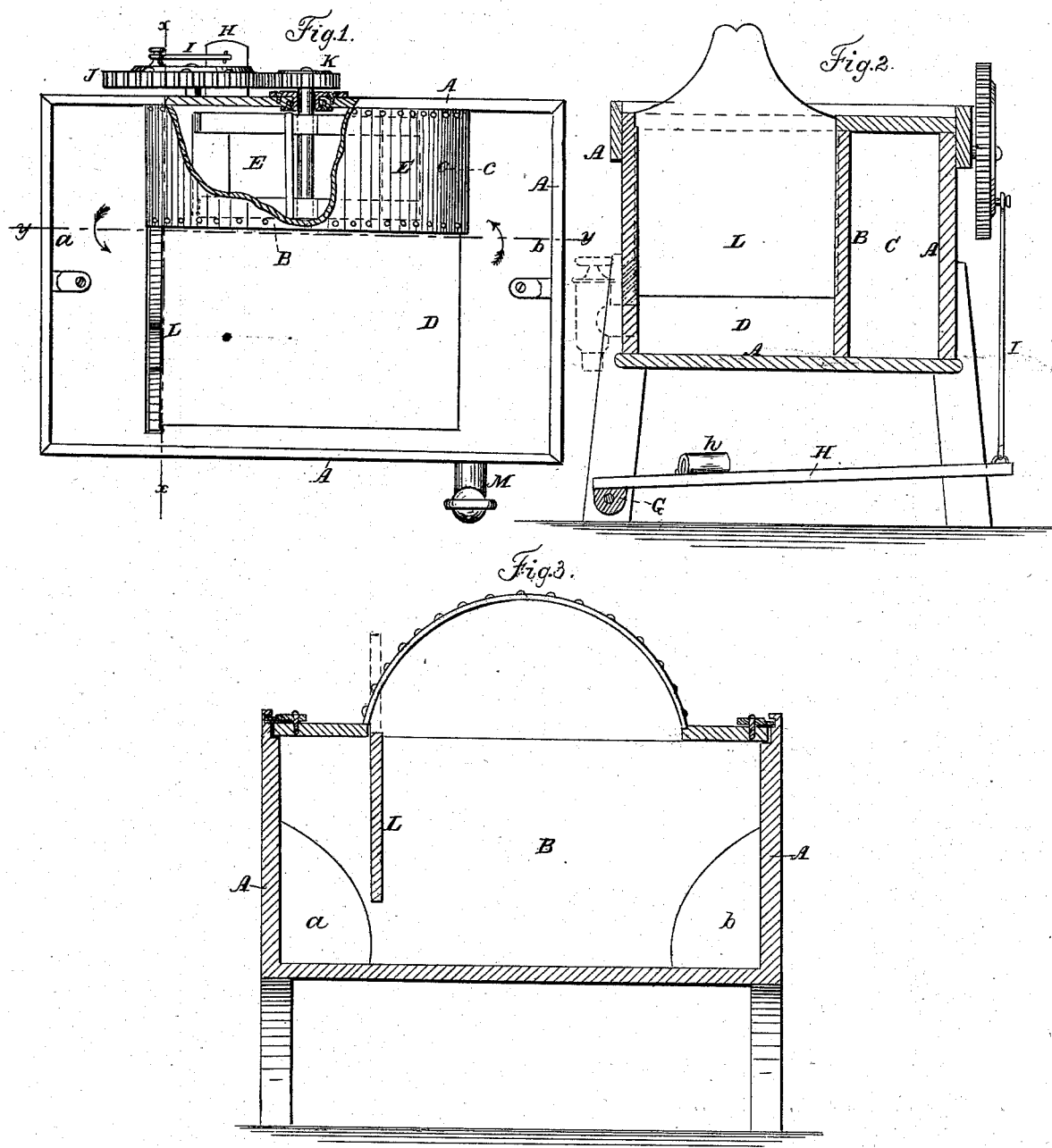
Witnesses:
Alvin Walker
George S Tambling
Inventor:
Thomas Bogan
Coburn Mann
Atty

United States Patent Office.

THOMAS BOGAN, OF LACON, ILLINOIS.

Letters Patent No. 68,034, dated August 27, 1867.

IMPROVEMENT IN CHURNS.

*The Schedule referred to in these Letters Patent and making part of the same.*

TO ALL WHOM IT MAY CONCERN:

Be it known that I, THOMAS BOGAN, of Lacon, in the county of Marshall, and State of Illinois, have invented a new and useful Improvement in Churns; and I do hereby declare and make known that the following is a full, clear, and exact description thereof, reference being had to the accompanying drawings and the letters and figures marked thereon, which form part of this specification.

My said invention consists in constructing the box of the churn which contains the cream in two compartments, having connecting passages at each end, in one of which compartments is arranged a horizontal paddle-wheel, by the operation of which the cream is driven rapidly around through said compartments in a continuous current, as hereinafter specified.

My said invention further consists in the arrangement of a slide or gatherer in one of said compartments, upon which the butter, rising to the surface in the above-described operation, is collected and removed from time to time, as required, until the churning is finished, when the buttermilk is drawn off through a faucet, as hereinafter described.

To enable those skilled in the art to make and use my invention, I will proceed to describe the same with particularity, making reference in so doing to the aforesaid drawings, in which—

Figure 1 represents a plan or top view of my invention.

Figure 2 is a vertical sectional view taken at the line $x$ in fig. 1; and

Figure 3 is a longitudinal vertical section at the line $y$ in said fig. 1.

Similar letters of reference indicate in the different figures the same parts of my invention.

A represents the box of the churn, which is of a rectangular form, supported upon any convenient supports or legs, and provided with a longitudinal vertical partition, B, on the line $y$, which divides the churn into two compartments C and D, in one of which is arranged a paddle-wheel, H, as shown, that part of the cover of the churn which lies over the said paddle-wheel being arched for that purpose, as clearly seen in fig. 3. At each end and at the bottom of the partition B are openings, $a\ b$, as seen in fig. 3, for the purposes described, and in the compartment D, near one end, is arranged a movable partition, L, which is supported in suitable vertical grooves so as to be moved up and down, and be removed for the purposes hereinafter set forth. Shoulders in the said grooves prevent the said slide L from touching the bottom of the churn, a sufficient space being left to allow the cream to pass beneath the slide, as desired. G represents a rock-shaft, supported near the floor in the supports at one side of the churn, having attached thereto a treadle, H, provided with a loop, $h$, for the foot or not, as preferred, the opposite end of said treadle being secured to a rod, I, secured to a crank-pin upon a gear drive-wheel, J, which engages with a pinion, K, upon the shaft of the paddle-wheel, by means of which arrangement the churn can be operated by the foot, leaving the hands and attention of the operator free to be devoted to any other purposes as may be desired.

Having described the construction of my invention, I will now proceed to describe its operation. The cream being introduced into the churn and the paddle-wheel set in motion by means of the treadle, as aforesaid, the cream is moved around in the churn through the aforesaid openings $a\ b$, in the direction of the arrows, as represented in fig. 1. The agitation of the cream in this manner soon causes the butter to rise upon the surface when the slide L is inserted in its place, before described, and the butter gathers upon it, and may from time to time be taken off, while the churn continues in motion until the butter is all collected, when the buttermilk is drawn off through the faucet M. The paddle-wheel more effectually breaks up and divides the globules of the cream than any of the devices now in use for this purpose, and the churn, constructed as described, requires comparatively but little labor and attention in its operation.

Having described the construction and operation of my invention, I will now specify what I claim, and desire to secure by Letters Patent:

1. I claim the combination of the treadle H, rod I, and gear-wheels J K, or their equivalent, with the paddle-wheel E, arranged and operating substantially as herein specified and shown.

2. I claim the combination of the partition B, provided with openings $a\ b$, the slide L, paddle-wheel E, and treadle H, with intermediate gearing, arranged and operating as herein specified and shown.

THOMAS BOGAN.

Witnesses:
D. B. WIER,
J. R. TAGGART.